UNITED STATES PATENT OFFICE.

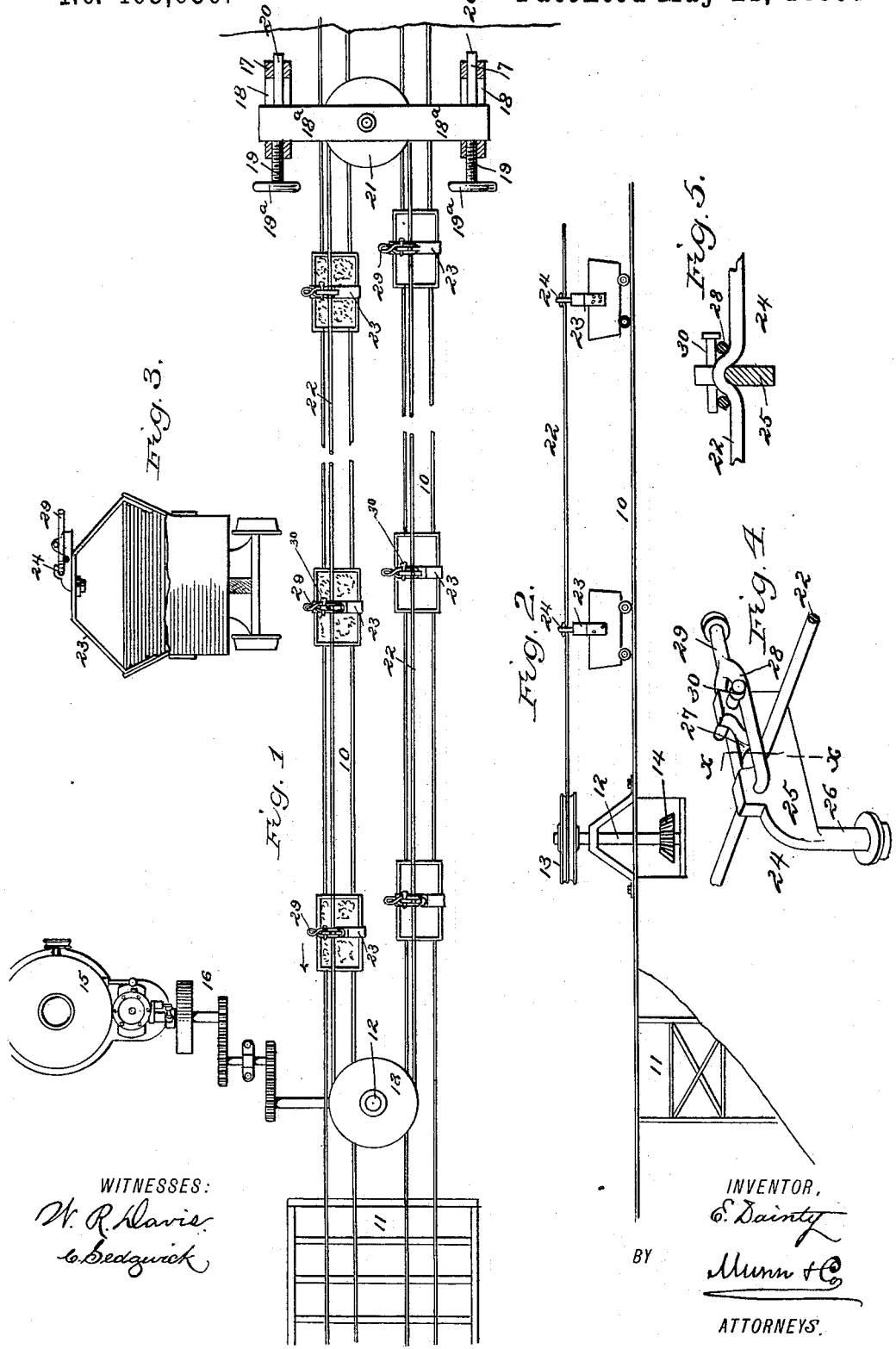

ELIJAH DAINTY, OF COAL BLUFF, PENNSYLVANIA.

GRIPPER FOR CABLES.

SPECIFICATION forming part of Letters Patent No. 403,650, dated May 21, 1889.

Application filed March 18, 1889. Serial No. 303,695. (No model.)

*To all whom it may concern:*

Be it known that I, ELIJAH DAINTY, of Coal Bluff, in the county of Washington and State of Pennsylvania, have invented a new and Improved Gripper for Cables, of which the following is a full, clear, and exact description.

My invention relates to an improvement in tramways, and has for its object to provide a simple and effective means for propelling cars or carriages upon a track from a suspended cable, and also to provide a simple and effective lock, whereby the cars or carriages may be conveniently and expeditiously attached to the cable or detached therefrom.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the tramway, illustrating the application thereto of the cars. Fig. 2 is a partial side elevation of the same. Fig. 3 is an end view of a car, partially in section, illustrating the grip secured thereto. Fig. 4 is a perspective view of the grip locked to the cable, and Fig. 5 is a vertical section through the grip on line $x$ $x$ of Fig. 4.

Between the tracks 10, at or near the dumping-ground 11, for instance, a shaft, 12, is journaled in bearings below the level of the track, which shaft is carried perpendicularly upward any desired distance above the track and provided at its upper end with an attached horizontal cable-pulley, 13, and at or near its lower end with a bevel-gear, 14, as best shown in Fig. 2. The shaft 12 is rotated from an engine, 15, or equivalent power, through the medium of any suitable train of gearing, 16, one arrangement of said gearing being illustrated in Fig. 1.

At or near the receiving end of the line or track vertical horizontal aligning standards 17 are planted or otherwise fixed, containing a slot, 18, in their upper ends, in which slots the extremities of a casing, 18ᵃ, are adjustably held, said casing being preferably box-like in general contour, having open sides. The casing is supported and adjusted in the standards by passing a screw, 19, through each standard into the casing, as shown in Fig. 1, said screws being provided with a hand-wheel, 19ᵃ, whereby they are manipulated. A pin, 20, is horizontally projected from each end of the casing at one side, which pins, sliding in apertures produced in the standards, serve to guide the casing in its lateral movement. In the center of the casing a horizontal cable-pulley, 21, is journaled, and an endless cable, 22, is passed around the two pulleys 13 and 21.

The cars, carriages, or other vehicles to be propelled are provided with a transverse yoke or bail, 23, fixed to their side pieces at or near the center, as shown in Fig. 3, the upper central surface of which bail or yoke is preferably flat. Upon the flattened surface of the bail or yoke a grip, 24, is swiveled, (illustrated in detail in Fig. 4.) The grip consists of a body, 25, from one end of which a post, 26, is downwardly projected, said post being pivotally secured to the car bail or yoke. In the upper edge of the body of the grip, preferably at its center, a recess, 27, is formed, the side walls of which curve upward and outward in opposite directions to facilitate the guidance of the cable to the base-wall, as shown in Figs. 4 and 5. A link, 28, is pivoted in the body near its swiveled end, capable of passing over the outer end of the body and horizontally across the recess 27, the outer end of the link being made to terminate in a handle, 29. The link is held in a locked or horizontal position by a pin, 30, passed above the same through the body.

In operation, when the cars are to be attached to the cable, the link is thrown back, exposing the body-recess 27, and the entire grip is turned until the cable is over the recess. The link is then brought to a contact with the upper surface of the cable, pressed to a horizontal position, and locked in such position by inserting the pin 30. By this means the cable is kinked at its point of contact with the grip, and the two thereby held in firm contact.

To release the car from the cable, the pin 30 is withdrawn and the link thrown back.

Having thus described my invention, what I claim as new, and desire to secure by Letters Patent, is—

1. The combination, with a cable, of a grip comprising a body portion provided with a recess in its upper edge, a link pivoted in said body, and a locking device adapted for contact with the link when in a horizontal position, substantially as described.

2. The combination, with a cable, of a grip comprising a body portion provided with a recess in its upper edge having oppositely-inclined walls, a link pivoted in said body having an attached handle, and a pin capable of passing through the body in contact with and above the link, substantially as shown and described.

3. The combination, with a car or other vehicle provided with an attached yoke or bail and a cable, of a grip swiveled to the vehicle yoke or bail comprising a body portion provided with a recess in its upper edge, a link pivoted in the body at one side of the recess, of a length sufficient to pass over one end of the body, and a removable locking device inserted in the body above the link, substantially as shown and described.

4. The combination, with a car or similar vehicle having a bail or yoke secured thereto, of a grip swiveled upon the yoke or bail comprising a body portion provided with a recess in its upper edge having oppositely-inclined side walls, a link pivoted in said body provided with a handle, and a locking-pin, all combined for operation substantially as shown and described.

ELIJAH DAINTY.

Witnesses:
J. F. ACKER, Jr.,
EDGAR TATE.